US009049873B2

(12) United States Patent
Westfall et al.

(10) Patent No.: US 9,049,873 B2
(45) Date of Patent: Jun. 9, 2015

(54) METHOD OF PRODUCING AN AROMATISED AQUEOUS LIQUID

(75) Inventors: Scott A. Westfall, Marysville, OH (US); Annette Michelle Birch, Powell, OH (US); Robert Garwood, Bellefontaine, OH (US); Iacopo Cerea, Orbe (CH); Miguel Angel Garchitorena Gamero, Lausanne (CH); Christophe Duchanoy, Suchy (CH)

(73) Assignee: Nestec S.A., Vevey (CH)

( * ) Notice: Subject to any disclaimer, the term of this patent is extended or adjusted under 35 U.S.C. 154(b) by 187 days.

(21) Appl. No.: 13/518,299

(22) PCT Filed: Dec. 8, 2010

(86) PCT No.: PCT/EP2010/069125
§ 371 (c)(1),
(2), (4) Date: Jun. 21, 2012

(87) PCT Pub. No.: WO2011/076564
PCT Pub. Date: Jun. 30, 2011

(65) Prior Publication Data
US 2012/0258222 A1 Oct. 11, 2012

(30) Foreign Application Priority Data
Dec. 22, 2009 (WO) ............... PCT/US2009/069207

(51) Int. Cl.
*A23F 5/48* (2006.01)
*A23F 5/36* (2006.01)
(52) U.S. Cl.
CPC .. *A23F 5/486* (2013.01); *A23F 5/36* (2013.01)

(58) Field of Classification Search
CPC .............. A23V 2250/2108; A23V 2200/15; A23V 2200/16; A23F 5/486; A23F 5/505; A23F 5/36; A23F 5/28; A23F 5/46; A23F 5/10
USPC .............. 426/474, 478, 386, 432, 594, 387
See application file for complete search history.

(56) References Cited

U.S. PATENT DOCUMENTS

| 4,335,149 | A | | 6/1982 | Stipp |
| 5,182,926 | A | * | 2/1993 | Carns et al. ............ 62/352 |
| 5,242,700 | A | | 9/1993 | Schlecht |
| 6,149,957 | A | * | 11/2000 | Mandralis et al. .......... 426/387 |
| 6,455,093 | B1 | | 9/2002 | Furrer et al. |
| RE38,434 | E | * | 2/2004 | Jennings ............ 137/14 |
| 7,794,772 | B2 | | 9/2010 | Goto et al. |

FOREIGN PATENT DOCUMENTS

| CN | 101292695 | | 10/2008 | |
| EP | 0 079 242 | | 5/1983 | |
| EP | 0213247 | * | 3/1987 | ............... A23F 5/48 |
| EP | 0 353 806 | | 2/1990 | |

(Continued)

*Primary Examiner* — Rena L Dye
*Assistant Examiner* — Lela S Williams
(74) *Attorney, Agent, or Firm* — K&L Gates LLP

(57) ABSTRACT

The present invention relates to a method for producing an aqueous liquid aromatised with aroma compounds from coffee, wherein a gas comprising aroma from roast and ground coffee and water is condensed to provide a liquid aqueous phase and a gas phase; and the gas phase is subjected to pressurisation in the presence of an aqueous liquid. The liquid is useful e.g. in the production of soluble coffee products.

11 Claims, 3 Drawing Sheets

(56) References Cited

FOREIGN PATENT DOCUMENTS

| | | |
|---|---|---|
| EP | 0 489 401 | 6/1992 |
| GB | 898752 | 9/1958 |
| JP | 2006020599 | 1/2006 |
| WO | WO 01/13735 * | 3/2001 ............... A23F 5/48 |

* cited by examiner

US 9,049,873 B2

METHOD OF PRODUCING AN AROMATISED AQUEOUS LIQUID

CROSS REFERENCE TO RELATED APPLICATIONS

The present application is a National Stage of International Application No. PCT/EP2010/069125, filed on Dec. 8, 2010, which claims priority to International Application No. PCT/US2009/069207, filed Dec. 22, 2009, the entire contents of which are being incorporated herein by reference.

FIELD OF THE INVENTION

The present invention relates to a method for producing an aqueous liquid aromatised with aroma compounds from coffee. The liquid is useful e.g. in the production of soluble coffee products.

BACKGROUND

Coffee extracts form the basis of soluble coffee products, whether in dried, powdery form (instant coffee) or in liquid form (e.g. as a ready-to-drink (RTD) coffee beverage. Aromas are an important part of soluble coffee products, if the product lacks the aroma associated with it, consumer perception of the product is adversely affected. Soluble coffee powders, which are obtained from commercial processes involving extraction, concentration, and drying, are usually substantially aroma-less. For this reason, it is conventional to recover coffee aromas which are given off during the processing of the soluble coffee powder and to reincorporate these aromas, e.g. into concentrated coffee extract prior to drying into a soluble coffee powder. The coffee aromas may be recovered at several points during processing, e.g. by aroma stripping of roast and ground coffee prior to extraction. WO 01/13735 discloses a method of recovering coffee aroma from coffee grounds comprising wetting, heating and stripping aroma from coffee grounds exposing the coffee grounds to a decreased pressure. The coffee aroma compounds released by this treatment are then recovered. EP 1069830 (note: GEAR patent) discloses a method comprising providing a slurry of roast and ground coffee and stripping aroma from this slurry by using a gas to provide an aromatised gas. In both methods aroma compounds are released from roast and ground coffee into a gas phase from where it is collected. This gas stream is composed of gases previously trapped in the roast coffee (primarily carbon dioxide), and possibly entrained air or steam. Recovering aroma from the gas is usually achieved by condensation of the aroma at low temperature, e.g. by cryogenic condensation. Cryogenic condensation is expensive and further does not lead to a complete recovery of all highly volatile coffee aroma compounds. There is a need to improve the recovery of high volatile aroma compounds and to reduce cost and complexity without subjecting the aroma containing gas to elevated temperatures that would lead to degradation of aroma compounds.

SUMMARY OF THE INVENTION

The inventors have found that a gas comprising aroma from roast and ground coffee and water can be condensed to produce a gas phase and a liquid aqueous phase. The gas phase comprising aroma compounds can be pressurised in the presence of an aqueous liquid leading to the transfer of aroma compounds from the gas phase to the aqueous liquid to produce an aromatised aqueous liquid. In this process the temperature increase that would normally happen during a pressurisation is avoided by the cooling effect of the aqueous liquid, and the recovery of highly volatile aroma compounds is improved compared to prior art methods.

Therefore, the present invention relates to a method of producing an aromatised aqueous liquid, the method comprising: a) providing a gas comprising aroma from roast and ground coffee and water; b) condensing the aroma and water comprising gas, to provide a liquid aqueous phase and a gas phase; and c) subjecting the gas phase obtained by step b) to pressurisation in the presence of an aqueous liquid to produce an aromatised aqueous liquid. In a further aspect, the invention relates to a method for producing a dried soluble coffee extract.

DETAILED DESCRIPTION OF THE INVENTION

Figure 1:
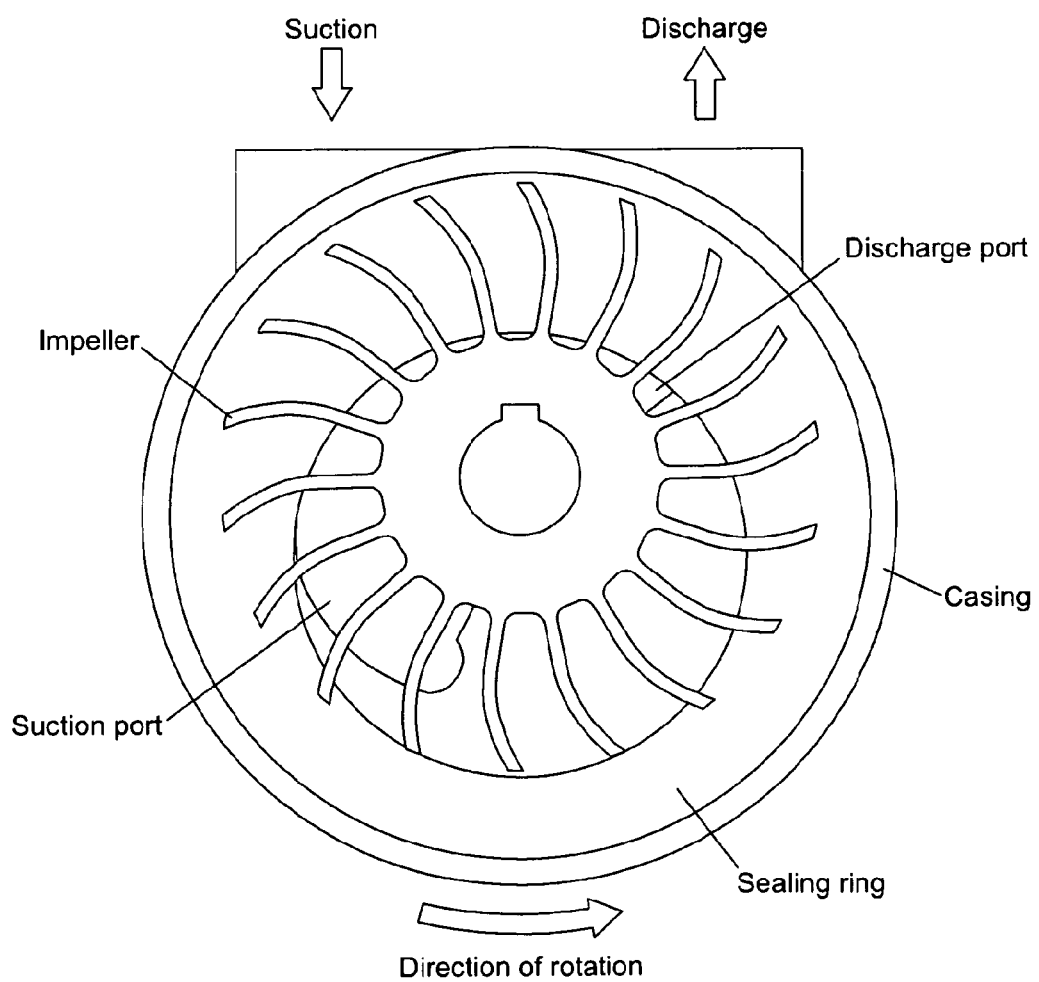
FIG. 1 schematically illustrates a liquid ring compressor.

According to the present invention a gas comprising aroma from roast and ground coffee and water is provided. This may be achieved by any suitable method, several such methods are well known to the skilled person. Preferably, the gas comprising aroma from roast and ground coffee and water is obtained by stripping roast and ground coffee to obtain an aroma containing gas. Several methods for stripping roast and ground coffee are known in the art e.g. from WO 01/13735 where aroma gas is released from roast and ground coffee under decreased pressure and EP 1069830 wherein a gas stream is used for stripping aroma into the gas phase. The aroma comprising gas from roast and ground coffee and water may also be obtained as grinder gas, i.e. the aroma rich gas that is released from roasted coffee beans during grinding, and for a period after grinding. The gas comprises water, this may e.g. originate from natural moisture comprised in roast and ground coffee, e.g. released during grinding and/or stripping and/or it may originate from water added to roast and ground coffee, e.g. if roast and ground coffee is wetted before or during stripping, or from injection of steam during stripping. The gas comprising aroma from roast and ground coffee and water may further comprise carbon dioxide, e.g. carbon dioxide released from the coffee beans.

The aroma and water comprising gas is condensed to provide a liquid aqueous phase and a gas phase. Condensation can be achieved by any suitable mean, but will usually be achieved by lowering the temperature of the gas so that a liquid aqueous phase condenses from the aroma and water comprising gas. The temperature used will e.g. depend on the pressure in the system and the moisture content of the aroma and water comprising gas. Usually, the aroma and water comprising gas will be condensed at a temperature between 0 and 40° C., such as between 5 and 30° C., or between 5 and 20° C. The pressure will usually be between 0.1 and 3 bar absolute pressure, such as between 0.2 and 2 bar absolute pressure, or between 0.3 and 1 bar absolute pressure. Any suitable condenser known in the art may be used. In a preferred embodiment of the invention, the aroma and water containing gas is not subjected to conditions of temperature and pressure whereat water will be in the solid phase (ice). In a further preferred embodiment, the aroma and water comprising gas is subjected to a minimum temperature above 0° C. during the process.

The gas phase obtained by the condensation of the aroma and water comprising gas is subjected to pressurisation in the presence of an aqueous liquid to produce an aromatised aqueous liquid. By subjection to pressurisation is meant that the pressure is increased compared to the pressure during the condensation step. Preferably, the pressure is increased to a value between 1 and 20 bar absolute pressure, such as between 2 and 15 bar absolute pressure, or between 2 and 8 bar absolute pressure, during the pressurisation step. The pressurisation is performed in the presence of an aqueous liquid. By this is meant that the gas phase is in contact with an aqueous liquid during the pressurisation. The pressurisation in presence of an aqueous liquid results in the transfer of aroma compounds from the gas phase into the aqueous liquid to produce an aromatised aqueous liquid, and at the same time the aqueous liquid may absorb heat created during the pressurisation of the gas, thus preventing the temperature from increasing as much as would have been the case if the gas phase was pressurised without an aqueous liquid present. In a preferred embodiment, the weight ratio of aqueous liquid to gas phase during the pressurisation is between 1:1 and 10000:1, such as between 3:1 and 5000:1. To minimise degradation of aroma compounds, the gas phase is preferably subjected to a maximum temperature below 60° C., such as below 50° C., or below 30° C.

The pressurisation may be performed in any suitable container or apparatus. The contact surface between the gas phase and the aqueous liquid and the contact time should be sufficient to allow effective transfer of aroma compounds from the gas phase to the liquid aqueous phase and to allow the temperature to be kept within the desired range. The temperature during the pressurisation may e.g. be kept at a desired level by circulating the aqueous liquid through a cooling device to remove heat generated by the pressurisation of the gas phase. The aqueous liquid present during pressurisation may be any suitable aqueous liquid, such as e.g. water or coffee extract. In a preferred embodiment the aqueous liquid present during the pressurisation comprises all or a part of the aqueous liquid phase obtained by the condensation of the aroma and water comprising gas. In this way the condensed aqueous liquid phase which may already comprise low and medium volatile coffee aroma components that were condensed together with water during the condensation step, may be further aromatised by transferring highly volatile aroma compounds to it from the gas phase, such that both aroma condensed during the condensation step and aroma transferred from the gas phase during the pressurisation step may be utilised.

In a preferred embodiment, the pressurisation in presence of an aqueous liquid is performed in a liquid ring compressor. A liquid ring compressor compresses gas by rotating a vaned impeller eccentric to a cylindrical casing. The aqueous liquid is fed into the pump and, by centrifugal acceleration, forms a moving cylindrical ring against the inside of the casing. This liquid ring creates a series of seals in the space between the impeller vanes, which form compression chambers. The eccentricity between the impeller's axis of rotation and the casing geometric axis results in a cyclic variation of the volume enclosed by the vanes and the ring of aqueous liquid. The gas phase is drawn into the pump via an inlet port in one end of the casing where the volume of the compression chambers formed by the impeller vanes and the liquid ring is largest and the gas is trapped in the compression chambers. The reduction in volume caused by the impeller rotation compresses the gas, and the compressed gas leaves the compressor at a discharge port in the other end of the casing where the volume of the compression chambers is smallest. The function of a liquid ring compressor is illustrated in FIG. 1 (note: figure illustrating liquid ring compressor to be made). To control temperature in the liquid ring compressor, the aqueous liquid is preferably circulated through an external heat exchanger. A liquid ring compressor system may be operated continuously. Two or more liquid ring compressors operated in series may be used. When the aqueous liquid phase obtained by the condensation of the aroma and water comprising gas is used as the aqueous liquid in a liquid ring compressor this liquid phase can be further aromatised and at the same time being utilised as the service and cooling liquid of the liquid ring compressor. The gas phase leaving the liquid ring compressor may entrain some liquid. This liquid may be separated from the gas and fed back to the aqueous liquid phase. The aromatised aqueous liquid obtained may be used for providing coffee aroma, e.g. to food products where this is desired. If not used immediately, the aromatised aqueous liquid may preferably be stored under pressure until used. Any suitable pressure may be used, e.g. in the range between 1 and 20 bar absolute pressure. Preferably the storage pressure is the same as the pressure in the compressor.

The method of the present invention may be utilised in the production of soluble coffee in many ways. For example, the aromatised aqueous liquid obtained may be used for aromatising a coffee extract by mixing the aromatised aqueous liquid with the coffee extract. Further, a dried soluble coffee product may be produced from such an aromatised coffee extract by drying the aromatised extract by methods well known in the art for drying coffee extracts, e.g. by spray drying or freeze drying. The gas comprising aroma from roast and ground coffee and water will usually also contain carbon dioxide from the coffee beans. This is e.g. the case if the gas is obtained by stripping of roast and ground coffee as described above. The carbon dioxide may, in whole or in part, be transferred to the aqueous liquid during the pressurisation. In the production of dried soluble coffee this carbon dioxide may be utilised to regulate the density of the final product, e.g. if aromatised aqueous liquid comprising carbon dioxide is mixed with a coffee extract to be dried. The amount of carbon dioxide added to the extract, and thus the density of the coffee extract, may easily be controlled by the skilled person by adjusting the parameters of the process, e.g. the pressurisation pressure and temperature, and the amount of aromatised aqueous liquid mixed with the extract. In this way the method of the invention may eliminate or reduce the need for adding carbon dioxide from an external source as is often done during production of soluble coffee to obtain the desired density of the soluble coffee powder. The density of soluble coffee powder is important, e.g. for dissolution properties as well as to ensure consistent dosing of the powder when preparing coffee.

Figure 2:
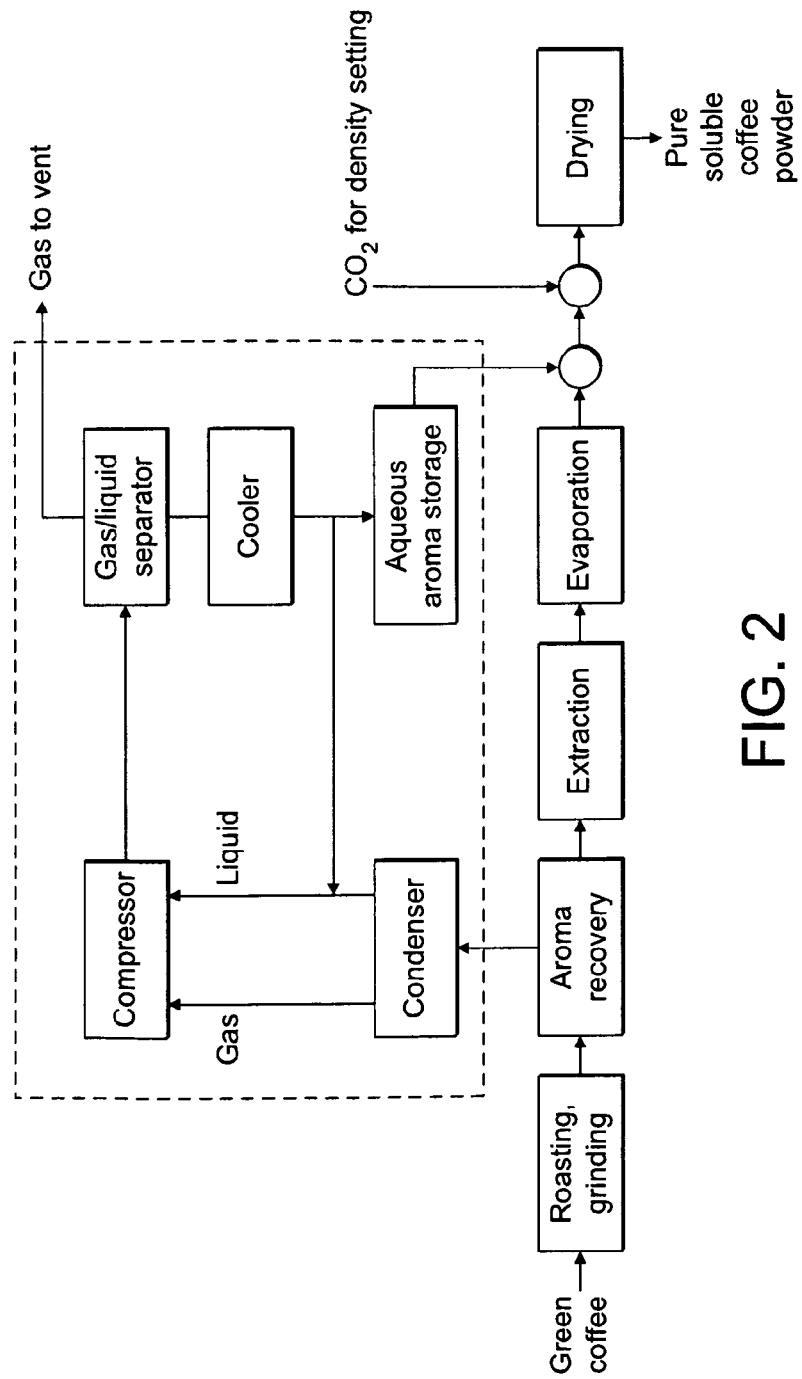
FIG. 2 illustrates and example of a process for producing a dry soluble coffee powder.

The process of the invention may be e.g. be used in the production of a soluble coffee extract, e.g. as illustrated in FIG. 2. The production of soluble coffee powder is well known in the art, and often includes the step of roasting green coffee beans, grinding them, recovering aroma from the roast and ground beans in the form of a gas comprising aroma from roast and ground coffee and water, extracting the roast and ground coffee beans with water, concentrating the coffee extract by evaporation and drying the concentrated extract to a powder, e.g. by spray drying or freeze drying. The method of the invention may be used to produce an aromatised aqueous liquid from the gas comprising aroma from roast and ground coffee and water, and this liquid may be added to the concentrated coffee extract before drying. Consequently, in one embodiment the method of the invention further comprises mixing the aromatised aqueous liquid obtained in step c) with a coffee extract. In a still further embodiment the method of the invention comprises drying this coffee extract after being mixed with the aromatised aqueous liquid, to obtain a dry soluble coffee extract.

In one embodiment of the invention roast and ground coffee is pre-wetted with an aqueous liquid prior to stripping the aroma from the coffee grounds with steam. The gas comprising aroma from roast and ground coffee and water obtained from the stripping of the coffee is condensed to provide a liquid aqueous phase and a gas phase; and said gas phase is subjected to pressurisation in the presence of said liquid aqueous phase to produce an aromatised aqueous liquid, preferably in a liquid ring compressor. The obtained aromatised aqueous liquid is then fed back and used for pre-wetting of roast and ground coffee entering the system to be stripped.

EXAMPLES

Example 1

Aroma Stripping

A blend of roast and ground *Arabica* and *Robusta* coffee beans was stripped as described in WO 01/13735 in a mixing chamber under vacuum wherein water was sprayed onto the coffee grounds to wet them and steam was injected into the bottom of the mixer to generate a gas comprising coffee aroma and water. The gas was drawn off the mixing chamber and fed to a condenser operating at about 10° C. to obtain an aromatised liquid aqueous phase and a gas phase.

Extraction

The stripped roast and ground coffee was extracted in a multi-stage extraction system extract as described in EP 0826308 to obtain a liquid coffee extract. The extract was concentrated in a standard evaporator and the concentrated extract was dried to a soluble coffee powder by freeze drying.

Sample A (Comparative)

The gas phase obtained from the condenser as described above was fed to a cryogenic condenser operating at below −100° C. to produce an aroma frost. This aroma frost as well as the liquid aqueous phase obtained from the condenser was added to the concentrated extract leaving the evaporator before freeze drying. Amount of $CO_2$ used to set density varied from 2.5 g $CO_2$/kg roast and ground coffee.

Sample B

Aroma stripping and extraction was performed as described above using coffee beans from the same blend as for Sample A. The gas phase obtained from the condenser as described above was fed to a liquid ring condenser and compressed to a pressure 350-900 milibar absolute at a temperature 12° C. The liquid aqueous phase obtained from the condenser was used as the liquid in the liquid ring condenser and circulated through a heat exchanger to keep the temperature in the range 12-20° C. The aromatised liquid phase leaving the liquid ring compressor was added to the concentrated coffee extract leaving the evaporator before freeze drying. The gas leaving the liquid ring compressor was discarded. The amount of $CO_2$ used to send the density was 1.5 g $CO_2$/kg roast and ground coffee.

Sensory Evaluation

The soluble coffee powders produced above was dissolved in 80° C. water at a concentration of 1.7 g/100 ml. A panel of 12 trained persons performed a blind evaluation of both samples twice using a standard list of attributes. Sample B had significantly higher scores for overall aroma, overall flavour, coffee aroma and coffee flavour, than Sample A.

Example 2

Four samples of soluble coffee were produced in the same way as Sample B of example 1 above, except that the temperature of compression was 12° C., 15° C., 20° C., and 25° C., respectively. The samples were reconstituted in hot water and two independent triangle discrimination test were performed comparing the 12° C. sample to the 15° C. sample, and the 12° C. sample to the 25° C. sample, using panels consisting of 37 and 34 trained panellists, respectively. The tests showed no significant differences between the samples.

Example 3

Five samples of soluble coffee were produced in the same way as Sample B of example 1 above, except that the pressure of compression was 2 bar, 3 bar, 4 bar, 5 bar, and 6 bar, respectively (absolute pressure).

Figure 3:
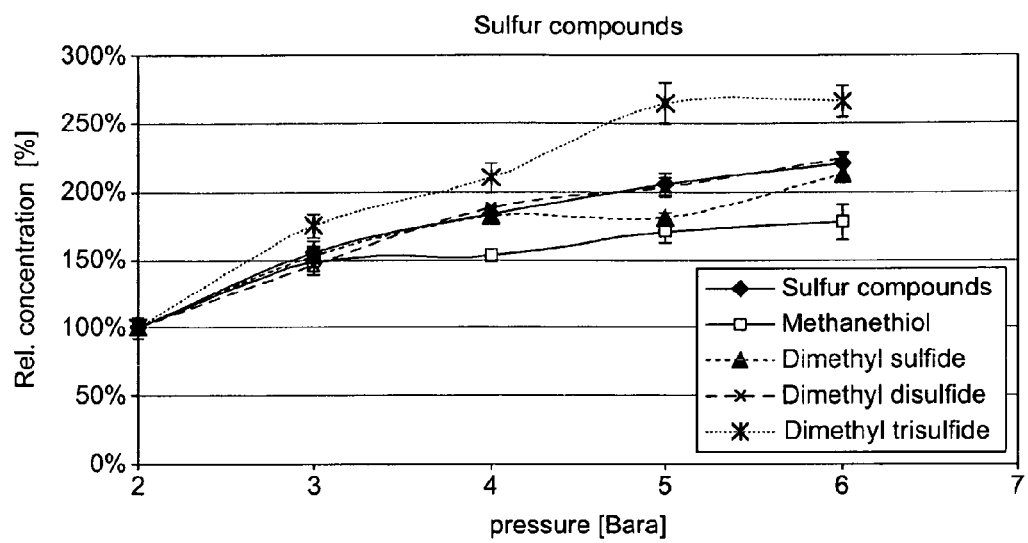
FIGS. 3 and 4 show results from example 3.
Figure 4:
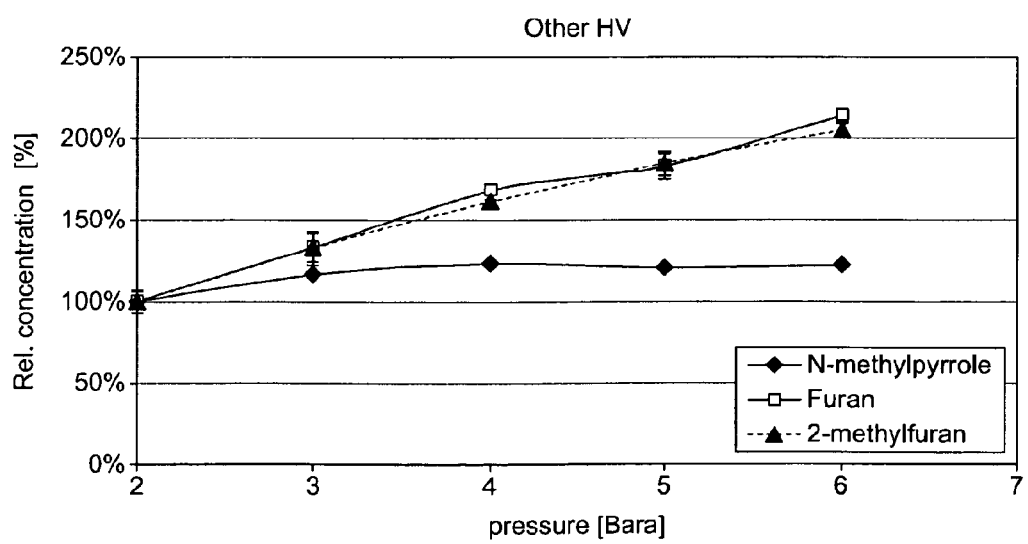

The recovery of key aroma compounds was assessed in the soluble coffee samples by relative quantification of marker compounds by SPME-GC/MS on an Agilent 7890/5975 GC/MS with DB-Wax GC-column (60 m×0.25 mm×0.25 µm). Results were expressed as relative concentrations in % of the amounts found in the sample produced with 2 bar compression. Standard deviation on 3 sample preparations is given by error bars. The following aroma compounds were assessed. The results are shown in FIGS. 3 and 4.

The invention claimed is:

1. A method of producing an aromatised aqueous liquid comprising:
   a) providing a gas comprising aroma from roast and ground coffee and further comprising water;
   b) condensing said gas comprising aroma and water to provide a liquid aqueous phase and a gas phase;
   c) subjecting the gas phase obtained by step b) to pressurisation in the presence of an aqueous liquid consisting of all or part of the aqueous liquid phase obtained in step b) to produce an aromatised aqueous liquid; and
   d) mixing a coffee extract with the aromatised aqueous liquid produced by the pressurisation.

2. The method of claim 1 wherein the aromatised aqueous liquid consists of the water and the aroma.

3. The method of claim 1 wherein the aroma and water comprising gas is condensed at a temperature of between 0 and 40° C.

4. The method of claim 1 wherein the aroma and water comprising gas is condensed at a pressure of between 0.1 and 3 bar absolute pressure.

5. The method of claim 1 wherein the gas phase obtained by step b) is pressurised to a pressure of between 2 and 20 bar absolute pressure in step c).

6. The method of claim 1 wherein the gas phase obtained by step b) is subjected to a maximum temperature of between 0 and 50° C. during the pressurisation in step c).

7. The method of claim 1 wherein the pressurisation in step c is performed in a liquid ring compressor.

8. The method of claim 1 wherein the gas comprising aroma from roast and ground coffee and water is provided by stripping aroma from roast and ground coffee with a gas.

9. The method of claim 8 wherein the roast and ground coffee has been wetted before and/or during the stripping with a gas.

10. The method of claim 1 wherein the gas phase is not subjected to conditions in which the water will be in a solid phase during the condensation.

11. A method of producing a dried soluble coffee extract, the method comprising:
    a) providing a gas comprising aroma from roast and ground coffee and further comprising water;
    b) condensing said gas comprising aroma and water to provide a liquid aqueous phase and a gas phase;

c) subjecting the gas phase obtained by step b) to pressurisation in the presence of an aqueous liquid consisting of all or part of the aqueous liquid phase obtained in step b) to produce an aromatised aqueous liquid that consists of the aroma and the aqueous liquid; and d) mixing a coffee extract with the aromatised aqueous liquid produced by the pressurisation.

\* \* \* \* \*